United States Patent [19]

Richards

[11] Patent Number: 5,100,453
[45] Date of Patent: Mar. 31, 1992

[54] METHOD FOR RECYCLING SCRAP MINERAL FIBERS

[75] Inventor: Ray S. Richards, Sylvania, Ohio

[73] Assignee: Glasstech, Inc., Perrysburg, Ohio

[21] Appl. No.: 665,678

[22] Filed: Mar. 7, 1991

[51] Int. Cl.[5] ............................................. C03B 5/187
[52] U.S. Cl. ....................................... 65/27; 65/134; 65/178; 65/335
[58] Field of Search ................... 65/27, 178, 134, 335, 65/28

[56] References Cited

U.S. PATENT DOCUMENTS

| | | | |
|---|---|---|---|
| 3,819,350 | 6/1974 | Pellett et al. ........................... | 65/134 |
| 3,951,634 | 4/1976 | Rough ................................... | 65/178 X |
| 4,145,202 | 3/1979 | Grodin et al. ......................... | 65/28 X |
| 4,309,204 | 1/1982 | Brooks .................................. | 65/28 |
| 4,422,862 | 12/1983 | Wardlow ............................. | 65/27 X |
| 4,432,780 | 2/1984 | Propster .............................. | 65/335 X |
| 4,820,328 | 4/1989 | Roberts et al. ....................... | 65/134 |

FOREIGN PATENT DOCUMENTS 704914  12/1979  U.S.S.R. .............................. 65/178

Primary Examiner—Robert L. Lindsay
Attorney, Agent, or Firm—Brooks & Kushman

[57] ABSTRACT

A method and apparatus for recycling scrap mineral fibers (42) having an organic binder coating in a highly stirred glass melter (16) wherein the organic binder coating is decomposed by applying heat. Carbon from the organic binder coating is oxidized on the surface of the glass melt (17). After oxidizing the carbon, the glass fibers are dispersed into the melt. Residual carbon may be oxidized after inclusion in the melt. Purified glass suitable for forming glass fibers is further processed by conventional glass fiber forming equipment. The method may also include the step of pre-processing the glass fiber scrap by shredding or pulverizing to facilitate feeding the glass fiber scrap to the highly stirred glass melt. The apparatus according to the present invention is preferably a stirred melter (16) having electrical joule effect heating. An impeller (22) in the glass melt stirs the melt at a high rate of speed to provide a draw down effect pulling fibers into melt.

19 Claims, 3 Drawing Sheets

METHOD FOR RECYCLING SCRAP MINERAL FIBERS

TECHNICAL FIELD

This invention relates to a method and apparatus for processing scrap mineral fibers, or scrap glass fibers. More particularly, this invention relates to a method and apparatus for recycling scrap glass fiber in a glass fiber melting operation by decomposing organic binders in a melter.

BACKGROUND ART

When glass fiber insulation or other glass fiber mat products are manufactured, scrap is generated by trimming operations. In many glass fiber manufacturing processes, glass fibers are collected in a loose mat, and treated by application of sizing chemicals and binders which coat the glass fibers to make products or to make them easier to process. After coating, the glass fiber mats are formed into battens or rolls with the edge portions being trimmed off. Generally, the portions trimmed off are disposed of by conventional solid waste disposal procedures. Because of the organic binders and sizing chemicals applied to the glass fiber strands, they cannot be easily remelted and recycled to form glass fibers.

Binders and sizing chemicals are organic compounds comprising primarily carbon, oxygen and hydrogen. If coated glass fiber scrap is introduced into a glass melting furnace, carbon residue from the coating remains after the coating is decomposed.

Carbon residue, even in small amounts, interferes with melting and formation of glass fibers using normal procedures. Another problem associated with recycling glass fiber scrap by melting is the difficulty in causing the glass fiber scrap to blend into a glass melt. Glass fiber scrap has a density of approximately five pounds per cubic foot. The glass fiber scrap tends to float on the surface of the melter, and form a static blanket over the top of a glass melt. Slow heat transfer through the blanket reduces the melting rate of the system in a conventional gas fired glass furnace. Glass fiber scrap fluff floats on top of the melt in conventional glass furnaces and becomes fused on its lower surface by the heat of the melt, and is fused on its upper surface by the temperature of the furnace atmosphere.

Carbon may react with the platinum bushings used to form continuous glass fiber strands or cause other deleterious operational problems in forming insulation products. Carbon also makes the glass black in color which is unacceptable in commercial glass fiber products.

While none of the prior art patents have solved the problems addressed by the Applicant's invention, several patents have addressed aspects of the problem such as the handling of glass fiber fluff. Other patents disclose the use of techniques such as introduction of oxidizing agents to a glass melter.

Three patents which address the problems relating to reprocessing or recycling glass fibers are Grodin U.S. Pat. No. 4,145,202, Propster, et al. U.S. Pat. No. 4,432,780, and Brooks U.S. Pat. No. 4,309,204. The Grodin patent discloses a method for reprocessing glass fibers in a special furnace wherein binders, coatings and sizes are removed. A controlled temperature heating is used to burn off coatings without melting the glass filaments. The glass fiber scrap is ground or milled, and may be added separately or in combination with batch materials. The finely ground scrap may be transported by a pneumatic transporter to either the batch house or the furnace.

The Propster, et al. patent discloses a method of reclaiming chemically coated glass scrap by introducing the scrap into an oxidizing atmosphere of a hydrocarbon fuel fired glass melting furnace. The recycled glass scrap is supplied over the top surface of the furnace with an oxidizing gaseous stream above the glass batch.

The patent to Brooks discloses a processing apparatus for remelting scrap glass fibers wherein a binder is removed in a remelting furnace which is maintained under oxidizing conditions to burn off organic binders or sizes.

Won et al. U.S. Pat. No. 4,545,800, and Kunkle, et al. U.S. Pat. No. 4,632,687 both disclose submerged combustion techniques which occur in a glass melt. In Won, et al., oxygen and hydrogen are combined in a glass melt to form water vapor. The patent to Kunkle, et al. discloses a glass batch process wherein coal is added to a glass batch, and forms a major energy source when combined in the glass batch. After the glass batch is melted, it is further processed in a reoxidization stage. Reoxidization is achieved by introducing oxygen through a bubbler tube and a gas burner.

Several patents have addressed problems of handling glass fiber scrap for recycling including Seng U.S. Pat. No. 4,853,024 and Dunn, et al. U.S. Pat. No. 4,615,720. The Seng patent discloses a scrap recovery apparatus wherein a rotary hot ball mill is used to convert wet scrap fibers into particulate fines. The Dunn, et al. patent discloses a method of controlling the speed at which glass batch is applied to the top surface of a molten glass pool.

These and other problems relating to the technology of recycling glass fiber scrap are addressed by the invention as summarized below.

DISCLOSURE OF INVENTION

The present invention relates to a method and apparatus for recycling mineral fibers having a coating, generally an organic coating, thereon. According to the invention, the coated mineral fibers are deposited into a vessel containing a molten glass bath. The molten glass bath is stirred at a speed sufficient to create surface currents which convey the coated mineral fibers along with the surface currents. The coated mineral fibers are heated while being conveyed by the surface currents to decompose the coating on the mineral fibers, leaving a carbon residue and mineral fibers. A substantial portion of the carbon residue is oxidized as the carbon residue and mineral fibers are conveyed by the currents across the surface of the molten glass bath thereby obtaining purified mineral fibers. The purified mineral fibers are dispersed into the molten glass bath by the action of a high speed stirrer so that the mineral fibers are melted to form a part of the molten glass bath.

According to another aspect of the invention, an oxidizer may be supplied to the vessel to impinge upon the coated mineral fibers as they are conveyed across the surface of the molten glass bath. The step of supplying an oxidizer above the melt surface may be performed by supplying air directly thereto or through an excess air burner. The quantity of oxidizers supplied may be determined by assaying the quantity of combustible coating constituents per unit of coated mineral fiber, measuring the quantity of coated mineral fiber deposited in the molten glass bath and varying accordingly the quantity of oxidizer supplied. Alternatively, the oxidizer content of exhaust gases emitted from the vessel may be measured, and the rate at which oxidizer is supplied is varied to maintain the oxidization potential at a desired level.

The present invention further comprises heating the coated mineral fibers after they are deposited on the glass surface by heat transfer through contact with the molten glass. Additionally, the heating step may be performed in part by a burner which heats the atmosphere in the top of the vessel.

According to another aspect of the present invention, in the stirring step, an inwardly directed flow zone is created near the stirrer by the action of the stirrer. The fibers are fed in a stream focused at the edge of the inwardly directed flow zone so that coated mineral fibers are drawn toward the center of the bath. The fibers remain resident on the surface so that decomposition of the coating of the mineral fibers, and oxidization of carbon is substantially completed prior to the mineral fibers being drawn under the surface and submerged in the glass bath.

According to another aspect of the invention, the coated mineral fibers are added to the bath at a surface controlled rate whereby the coated mineral fibers do not form a static blanket over the surface of the glass bath.

It is an object of the invention to provide a method of recycling scrap mineral fibers which have been treated with an organic coating material wherein the organic coating is decomposed and carbon residue is oxidized as the mineral fibers are conveyed by surface currents on the surface of a highly stirred molten glass bath.

It is a further object of the invention to provide a method wherein such coated mineral fibers are permitted to remain resident on the surface for a sufficient length of time to permit decomposition of the coating and oxidization of carbon.

Another object of the invention is to provide a method wherein coated glass fibers are added to a molten glass bath and an oxidizing atmosphere is maintained above the glass melt by monitoring the quantity and composition of the coated mineral fibers added.

It is another object of the invention to recycle coated mineral fibers wherein gaseous exhaust is monitored to determine whether an oxidizing atmosphere is present, and to control addition of an oxidizing agent in the method.

It is another object of the invention to recycle coated mineral fibers wherein the fibers are added at a controlled rate to a highly stirred glass melt which agitates the fibers on the surface and speeds heat transfer to decompose and oxidize the coating and also speed melting of glass fibers after purification.

These and other objects are achieved by the present invention as will be appreciated upon review of the attached drawings in light of the following description of the best mode for carrying out the invention.

BEST MODE FOR CARRYING OUT THE INVENTION

Figure 1:
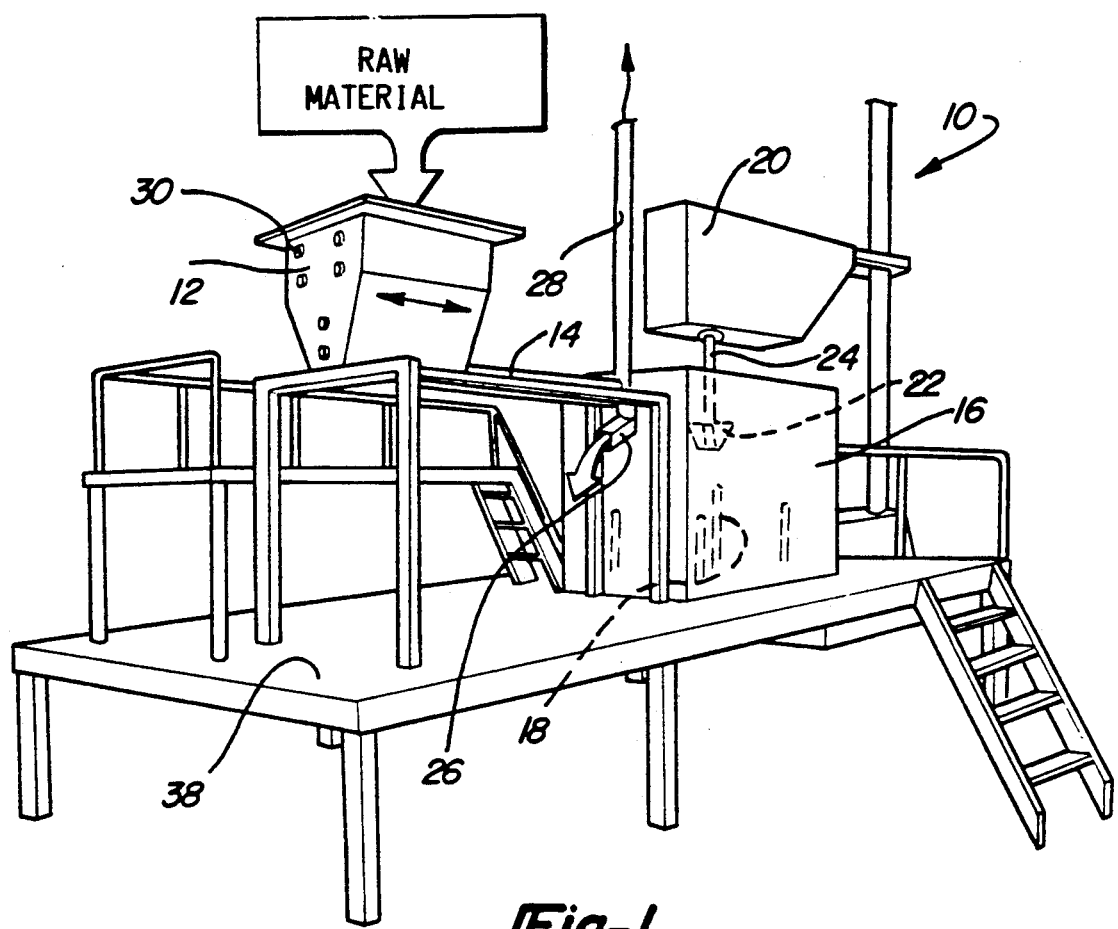
FIG. 1 is a perspective view of a highly stirred melter and a mineral fiber feed hopper useful in practicing the present invention.

Referring now to FIG. 1, a highly stirred melter system 10 is shown which would be useful in practicing the present invention. The mixer melter system 10 includes a hopper 12 in which raw material such as mineral fiber or scrap glass fibers having an organic coating are stored for subsequent feeding into the system. A screw conveyor 14 is provided to convey the scrap glass fibers to a refractory melter 16.

In the refractory melter 16, a glass melt 17 is heated primarily by joule effect heating by a plurality of electrodes 18 which extend through the bottom of the refractory melter 16. In the disclosed embodiment, four electrodes are used. The electrodes 18 in the illustrated embodiment are in a single phase circuit with adjacent electrodes being of opposite polarity. It is anticipated that the most preferred approach would employ multiphase circuitry.

A drive 20 drives an impeller 22, or stirrer, rotationally at a high speed. The drive 20 is connected to the impeller 22 by a shaft 24 which is preferably water cooled.

The refractory melter 16 includes a spout 26 through which molten glass can be ported for further processing. Incorporated within the spout 26 is an exhaust vent 28 through which products of combustion and products of the oxidization reaction may be directed for further processing in a scrubber, or the like.

The hopper 12 preferably includes a plurality of shafts 30 which include a plurality of fingers 32 which rotate with the shaft 30 to force the mineral fibers or glass fibers through the hopper 12.

The screw conveyor 14 includes a screw 34 which is rotated by a drive motor (not shown) in a tubular conduit 36 so that mineral fibers from the hopper 12 may be conveyed at a controlled rate to the refractory melter 16.

The entire mixer melter system 10 is preferably supported on a platform 38 with the hopper 12, screw conveyor 14, refractory melter 16 and drive 20 cooperating to perform the method of the present invention.

Figure 2:
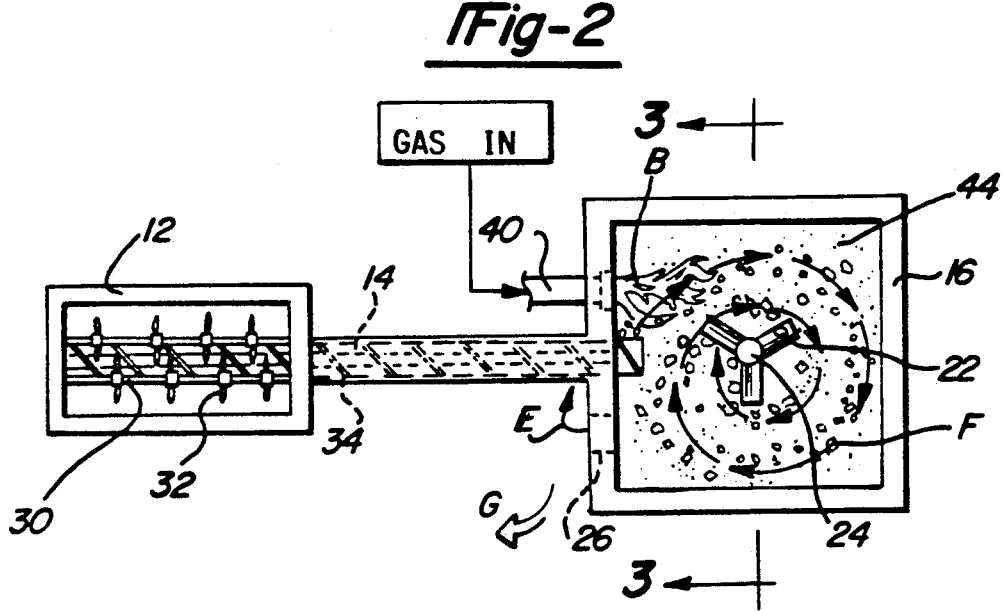
FIG. 2 is a diagrammatic plan view of a hopper, screw conveyor and highly stirred melter used in practicing the present invention.

Referring now to FIG. 2, feeding the coated mineral fiber scrap from the hopper 12 through the screw conveyor 14 and into the refractory melter 16 is shown. The operation of a gas fired excess air burner is also illustrated. The burner 40 is located in the same wall of the refractory melter 16 as the screw conveyor 14. A jet of gases from combustion is introduced into the melter 16 adjacent the screw conveyor 14. Scrap melter fibers 42 are deposited on the surface of the glass melt 17 so that surface currents on the glass melt draw them inwardly through an inwardly directed flow zone.

Figure 3:
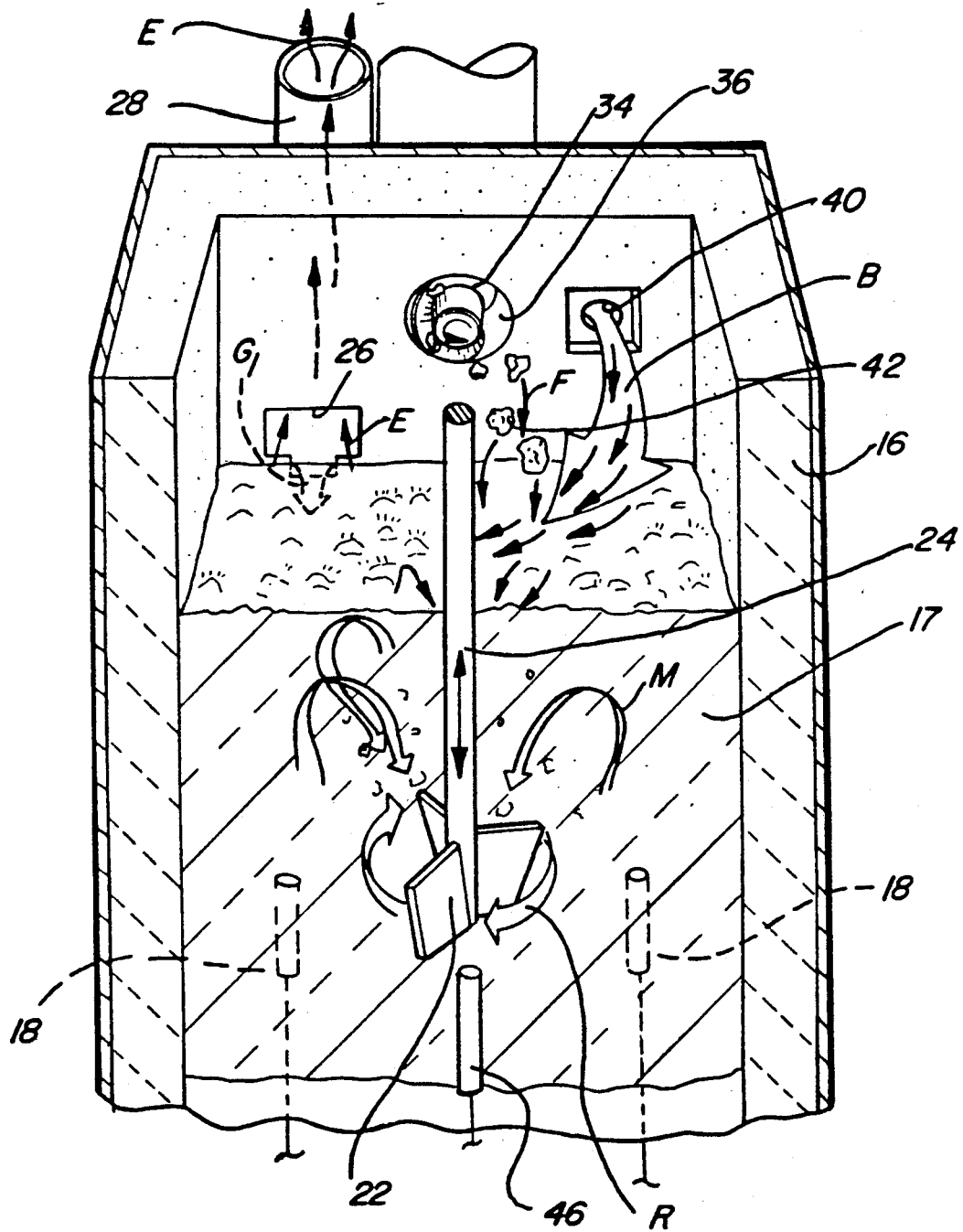
FIG. 3 is a cross-sectional view taken along the line 3—3 in FIG. 2 showing mineral fibers being fed to the highly stirred melter with a gas burner heating the area above the melt and the impeller mixing the glass melt in accordance with the present invention.

Referring now to FIG. 3, the refractory melter 16 is cut away to show the deposit of mineral fibers 42 on the surface of the glass melt 17 by the screw conveyor 14. The fiber flow in the inwardly directed flow zone is shown by arrows "F". The impeller 22 rotates as indicated by impeller rotation arrows "R" to cause a melt mixing flow illustrated by arrows "M". A thermocouple 46 is provided in the center of the melter to monitor glass melt conditions. The thermocouple 46 is preferably inserted through an opening 48 which may be used to drain the melter by removing the thermocouple 46.

Arrow "B" illustrates the general flow of combustion products from the burner 40. The glass output follows the path illustrated by arrow "G" through the spout 26 while exhaust gases denoted by arrows "E" are directed through the spout 26 to the exhaust vent 28. Exhaust gases may then be treated by cyclonic separators or scrubbers to remove any contaminates. The exhaust gases are made up of the products of combustion, excess oxygen, carbon dioxide and other volatiles.

Figure 4:
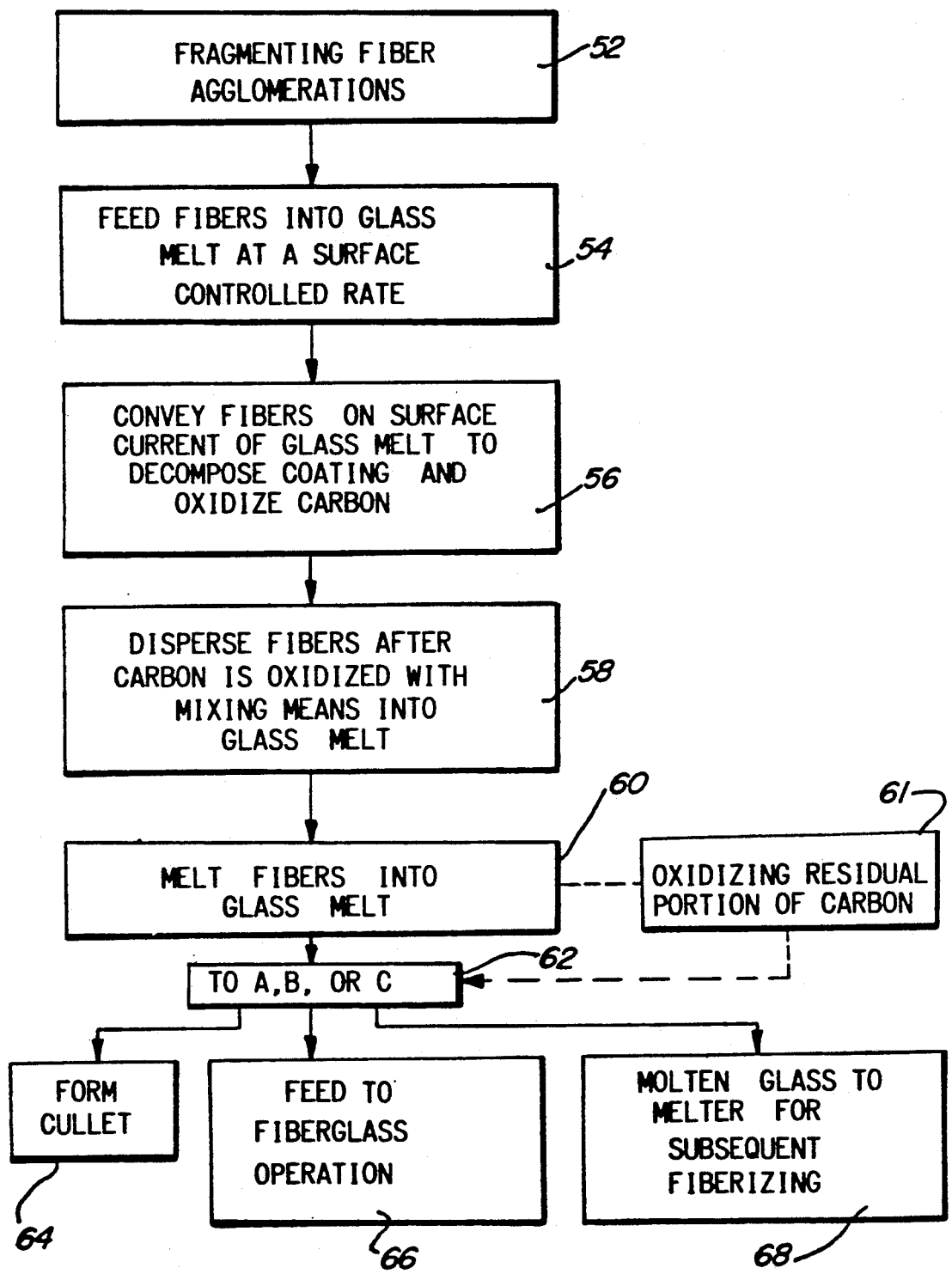
FIG. 4 is a block diagram illustrating the steps of the method of the present invention.

Referring now to FIG. 4, a flow chart is provided to explain the steps of the process of the present invention. The first step indicated by reference numeral 52 in FIG. 4 is that of fragmenting the fiber agglomerations in the coated scrap mineral fibers. The coated scrap mineral fibers are typically compacted or bundled into bales for ease of handling. It is anticipated that some flows of scrap material may not be bundled or compacted if they are conveyed directly from a glass fiber forming trim operation without compacting, if so, and the step of fragmenting could be eliminated.

A second step of feeding illustrated by reference numeral 54 includes feeding the fibers onto the glass melt 17 at a surface controlled rate.

The next step is to convey fibers on a surface current as represented by reference numeral 56 across a portion of the glass melt where the action of heat on the coating decomposes the coating and oxidizes the carbon.

It is a primary objective of the present invention to eliminate carbon from the organic coatings prior to the mineral fibers being mixed into the glass melt. Elimination of a substantial portion of carbon as used herein is intended to refer to removing at least 95% of the carbon. Viewed differently, an unoxidized residue of less than 0.3% to 0.4% and more preferably 0.1% is desired. Quantities of carbon greater than 0.1 percent may require additional refining steps to eliminate carbon from the glass melt. Such additional refining steps may include heating the glass melt to oxidize the carbon by sodium or silicon glass reactions or may include further aeration or oxidization of the melt by an oxidizer. Also, addition of raw batch materials can cause oxidation of carbon residue. Examples of such batch materials could include sodium carbonate, hydrated sodium tetraborate, calcium carbonate, or the like.

Referring now to FIG. 4, reference numeral 58 indicates the next step in which the fibers after the carbon has been oxidized are dispersed by the impeller, or mixing means into the glass melt. The fibers are melted and are dispersed into the glass melt rapidly due to their small diameter and the speed at which the mixing means dispersed the fibers into the glass melt. Melting the glass fibers is shown by reference numeral 60. After the fibers have been incorporated into the glass melt and melted, the additional glass melt created is removed at reference numeral 62 and further processed.

Currently, it is anticipated that the melted glass would be processed by quenching with water to form cullet as indicated by reference numeral 64. The molten glass removed from the melter could also be used to feed existing melting and processing equipment as indicated by reference numeral 66. Additional batch constituents and time for separation of gaseous occlusions can be provided to assure formation of commercially acceptable mineral fibers. Alternatively, the molten glass could conceivably be supplied directly to a forehearth of a glass fiberizing operation as indicated by reference number 68.

It will be appreciated by one of ordinary skill in the art to which the invention relates that the above description is of a best mode for carrying out the invention, and that it is intended to be illustrative and not limiting. The scope of the invention is to be measured by reference to the following claims.

I claim:

1. A method of recycling coated mineral fibers comprising the steps of:
   depositing said coated mineral fibers into a vessel containing a molten glass bath having a surface;
   stirring the molten glass bath with a stirrer at a speed sufficient to convey to coated mineral fibers along with a surface current;
   heating the coated mineral fibers while being conveyed to decompose the coating on the mineral fibers leaving a carbon residue and mineral fibers;
   oxidizing a first portion of said carbon residue as said carbon residue and mineral fibers are conveyed by the currents across a portion of the surface of said molten glass bath to obtain purified mineral fibers; and
   dispersing the purified mineral fibers and a second portion of said carbon residue with said stirrer into the molten glass bath wherein the mineral fibers are melted to form part of the molten glass bath.

2. The method of claim 1 further including the step of supplying an oxidizer to the vessel to impinge upon the coated mineral fibers as they are conveyed across said portion of the surface of said molten glass bath.

3. The method of claim 1 wherein said step of supplying an oxidizer is performed by supplying air through an excess air burner.

4. The method of claim 1 wherein the quantity of oxidizer supplied is determined by assaying the quantity of combustible coating constituents per unit of coated mineral fiber and then measuring the quantity of coated mineral fiber deposited in the molten glass bath and varying the quantity of oxidizer supplied accordingly.

5. The method of claim 1 further including the steps of measuring the oxidizer content of an exhaust gas emitted from the vessel and varying the rate at which said oxidizer is supplied to maintain the oxidization potential at a desired level.

6. The method of claim 1 wherein said coated mineral fibers are deposited on the glass surface while said mineral fibers are being heated by heat transfer through contact with the molten glass.

7. The method of claim 1 wherein said heating step is performed in part by a burner which heats atmosphere in the top of the vessel thereby heating the coated mineral fibers as they fall into the molten glass bath.

8. The method of claim 1 wherein said stirring step creates an inwardly directed flow zone and an upwelling zone on the surface of the molten glass bath and wherein said step of depositing coated mineral fibers is performed by feeding the fibers in a stream focused at the edge of the directed flow zone so that coated mineral fibers are drawn toward the center of the bath as said coated mineral fibers remain resident on the surface whereby decomposition of the coating of the mineral fibers and oxidization of carbon is substantially completed prior to the mineral fibers being drawn under the surface and submerged in the glass bath.

9. The method of claim 1 wherein said step of depositing coated mineral fibers is surface limited whereby coated mineral fibers are supplied to the vessel at a controlled rate so that the coated mineral fibers do not form a static blanket over the surface of the molten glass bath.

10. The method of claim 1 wherein an oxidizing atmosphere is maintained within the vessel by supplying air to the vessel and wherein a burner is employed to heat a region above the molten glass bath by combustion of fuel and wherein the ratio of air to fuel supplied to the burner is greater than the stoichiometric amount required to burn the fuel supplied and also oxidize carbon supplied by the coated mineral fibers.

11. The method of claim 1 wherein said coated mineral fibers are glass fiber scrap having an organic binder.

12. The method of claim 1 wherein said stirrer is an impeller.

13. The method of claim 1 wherein said steps of heating the coated mineral fibers and dispersing the purified mineral fibers are performed in a single vessel.

14. The method of claim 1 further comprising the step of preprocessing the mineral fibers by mechanically breaking agglomerations of mineral fibers into smaller fragments prior to said step of depositing the mineral fibers in the vessel.

15. The method of claim 1 further including the step of supplying an oxidizing agent to said vessel.

16. The method of claim 1 wherein the step of supplying the oxidizing agent comprises injecting air into the vessel above the molten glass bath.

17. The method of claim 1 wherein said second portion of said carbon residue is stirred into said molten glass bath, said second portion of said carbon residue subsequently moving to the surface where it is oxidized.

18. The method of claim 17 wherein said second portion of said carbon residue subsequently undergoes a glass reaction with a constituent material of said molten glass bath to remove carbon residue from said molten glass melt.

19. The method of claim 18 further comprising the step of adding raw bath materials as said constituent material to the melt which provides the oxidizer for said second portion of said carbon residue.

* * * * *